(12) United States Patent
Matsumura et al.

(10) Patent No.: US 7,651,251 B2
(45) Date of Patent: Jan. 26, 2010

(54) COMBINED VIEWING MIRROR AND TURN SIGNAL LAMP FOR AUTOMOTIVE VEHICLES

(75) Inventors: Norikazu Matsumura, Akashi (JP); Ryota Obuki, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 12 days.

(21) Appl. No.: 11/934,988

(22) Filed: Nov. 5, 2007

(65) Prior Publication Data

US 2008/0117643 A1    May 22, 2008

(30) Foreign Application Priority Data

Nov. 16, 2006    (JP)    ............................... 2006-310570

(51) Int. Cl.
*B60Q 1/26*    (2006.01)

(52) U.S. Cl. .................. 362/494; 362/549; 362/523; 362/528

(58) Field of Classification Search .................. 362/549, 362/523, 473–476, 528–532, 413, 414, 427
See application file for complete search history.

(56) References Cited

U.S. PATENT DOCUMENTS

| | | | | |
|---|---|---|---|---|
| 4,988,068 A | * | 1/1991 | Yamana et al. ............... | 248/484 |
| 6,817,742 B2 | * | 11/2004 | Lin ............................. | 362/494 |
| 6,926,431 B1 | * | 8/2005 | Foote et al. .................. | 362/494 |
| 6,981,789 B2 | * | 1/2006 | Assinder et al. ............. | 362/494 |
| 7,165,853 B2 | * | 1/2007 | Gilbert et al. ................ | 359/841 |
| 7,258,471 B2 | * | 8/2007 | Rodriguez Barros et al. ................. | 362/494 |
| 2004/0129853 A1 | | 7/2004 | Suzuki et al. | |
| 2005/0237643 A1 | | 10/2005 | Wu | |

FOREIGN PATENT DOCUMENTS

| | | |
|---|---|---|
| CN | 2523673 | 12/2002 |
| JP | 2001-213375 | 8/2001 |
| JP | 2004-244004 | 9/2004 |
| JP | 2006-069299 | 3/2006 |
| WO | 01/28815 | 4/2001 |

\* cited by examiner

*Primary Examiner*—Jong-Suk (James) Lee
*Assistant Examiner*—Leah S Lovell

(57) ABSTRACT

A combined viewing mirror and turn signal lamp assembly (2) for this purpose includes a generally elongated stay (8) connected at one end (8a) thereof with a body of an automotive vehicle, and a rear viewing mirror (10) connected with the opposite end (8b) of the elongated stay. A turn signal lamp (12) is incorporated in a portion (8c) of the stay intermediate between the ends of the stay.

6 Claims, 5 Drawing Sheets

COMBINED VIEWING MIRROR AND TURN SIGNAL LAMP FOR AUTOMOTIVE VEHICLES

BACKGROUND OF THE INVENTION

1. Field of the Invention

The present invention relates to a combined viewing mirror and turn signal lamp for automotive vehicles such as, for example, motorcycles and four-wheeled automotive vehicles.

2. Description of the Prior Art

Rear viewing mirrors and front turn signal lamps are respective elements statutorily indispensable to automotive vehicles such as, for example, motorcycles. In view of their different functions and mechanisms, each rear viewing mirror and each front turn signal lamp are generally members separate from each other. Accordingly, each rear viewing mirror and each front turn signal lamp are required to be mounted on the automotive vehicle separately, resulting in increase of time and labor required to mount them on the automotive vehicle. Some four-wheeled automobiles employ a mirror to view not rear but near front of the vehicle body and a turn signal lamp, which are also members separate from each other.

The Japanese Laid-open Patent Publication No. 2006-069299, published Mar. 16, 2006, for example, discloses a rear viewing mirror casing, in which a front turn signal lamp is incorporated so that the rear viewing mirror and the turn signal lamp can be assembled in a unitary structure. The unitary structure including the rear viewing mirror and the turn signal lamp, both accommodated in the mirror casing, is mounted on the motorcycle through a support arm having one end rigid with the mirror casing and the opposite end adjustably connected with an associated side portion of the motorcycle, for example, that of a front fairing. According to this structure, since the support arm is capable of undergoing an angular movement relative to the motorcycle, it is not easy to accomplish wiring of an electric cable extending from and to the turn signal lamp through a hollow portion of the support arm.

SUMMARY OF THE INVENTION

In view of the foregoing, the present invention is intended to provide a combined viewing mirror and turn signal lamp assembly of a kind, which requires a minimized number of component parts and accomplishes an efficient mounting work of the viewing mirror and the turn signal lamp and in which, even when the angle of tilt of the viewing mirror relative to the eyesight of a vehicle driver or rider is adjusted, the electric cable extending from and to the turn signal lamp will not be affected adversely.

In order to accomplish the foregoing object, a combined viewing mirror and turn signal lamp assembly of the present invention includes a generally elongated stay having first and second ends opposite to each other, the first end of the elongated stay being connected with a body of an automotive vehicle, a viewing mirror connected with the second end of the elongated stay, and a turn signal lamp incorporated in the stay.

It is to be noted that the term "body" of the automotive vehicle referred to hereinabove and hereinafter is intended to encompass any structural element of the automotive vehicle excluding a vehicle power plant inclusive of, for example, a combustion engine and a power transmission device, and electric appliances and including a vehicle frame structure, a front fork supported by the vehicle frame structure and forming a part of the skeleton of the automotive vehicle, a fairing, side coverings and tail coverings.

According to the present invention, since the viewing mirror and the turn signal lamp are incorporated in the generally elongated stay to unite them in a unitary structure, the number of component parts can be reduced and the number of assembling steps can also be reduced.

The elongated stay employed in the present invention is of a structure, in which the first and second end thereof are connected respectively with the body of the automotive vehicle and the viewing mirror and the turn signal lamp is fitted to a portion thereof generally or substantially intermediate of the length of the stay. Accordingly, a portion of the elongated stay from a joint thereof with the vehicle body to the turn signal lamp can be fixed in position and, therefore, even though the angle of tilt of the viewing mirror is adjusted, there is no possibility of the electric cable twisted and/or bent undesirably.

The turn signal lamp referred to above may be preferably positioned generally intermediate between the first end of the stay and the rear viewing mirror. The rear viewing mirror and the turn signal lamp so positioned results in in-line disposition with each other in a direction conforming to the longitudinal sense of the combined viewing mirror and turn signal lamp assembly and, accordingly, such assembly can have an appearance pleasant to look, having been slimed in shape as a whole.

In a preferred embodiment of the present invention, the turn signal lamp may be provided with an engagement portion and the stay may be provided with a to-be-engaged with which the engagement portion is engageable. In this case, the turn signal lamp is removably connected with the stay by means of a fastening member while the engagement portion is engaged in the to-be-engaged portion. This is particularly advantageous in that the use of the only one fastening member such as a screw member is sufficient to allow the stay and the turn signal lamp to be carried together and the number of component parts can be therefore reduced.

In another preferred embodiment of the present invention, the turn signal lamp may also include a turn signal lamp casing, having first and second ends opposite to each other, and a light emitting element accommodated within the turn signal lamp casing. The engagement portion is preferably in the form of a hollow cylinder formed in the first end of the turn signal lamp casing, and the stay preferably has a cable hole defined therein for passage of an electric cable therethrough into the assembly. A part of the cable hole referred to above forms an engagement hole, which in turn forms the to-be-engaged portion. In this case, the electric cable is introduced into the turn signal lamp casing after having been passed through the cable hole and the hollow of the engagement portion, thereby facilitating the wiring of the electric cable.

Preferably, the turn signal lamp may be connected with the stay through the fastening member at a portion adjacent the second end of the turn signal lamp casing while having the engagement portion defined in the first end of the turn signal lamp casing. By so doing, the turn signal lamp can be advantageously stably secured to the stay.

The stay referred to above may be formed with a protective wall for covering a region rearwardly of the turn signal lamp. Considering that the fastening member is generally positioned rearwardly of the turn signal lamp, formation of the protective wall in the stay is effective to protect the fastening member and also to conceal the fastening member from view to thereby provide a sophisticated appearance. Furthermore, the provision of the protective wall is effective to substantially increase the cross-sectional shape of the stay to thereby increase the strength of the stay.

The viewing mirror referred to above may be preferably connected with the stay by means of, for example, a spherical bearing unit for angular movement relative to such stay. By so doing, the viewing mirror can be adjusted in its tilting angle, and also, damage to the viewing mirror can be minimized advantageously since in the event that an external impact acts on such viewing mirror for some reason, the viewing mirror can sway about the geometric center of the semispherical bearing unit in a direction generally counter to the direction of the impact.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will now be described in detail with particular reference to the accompanying drawings.

Figure 1:
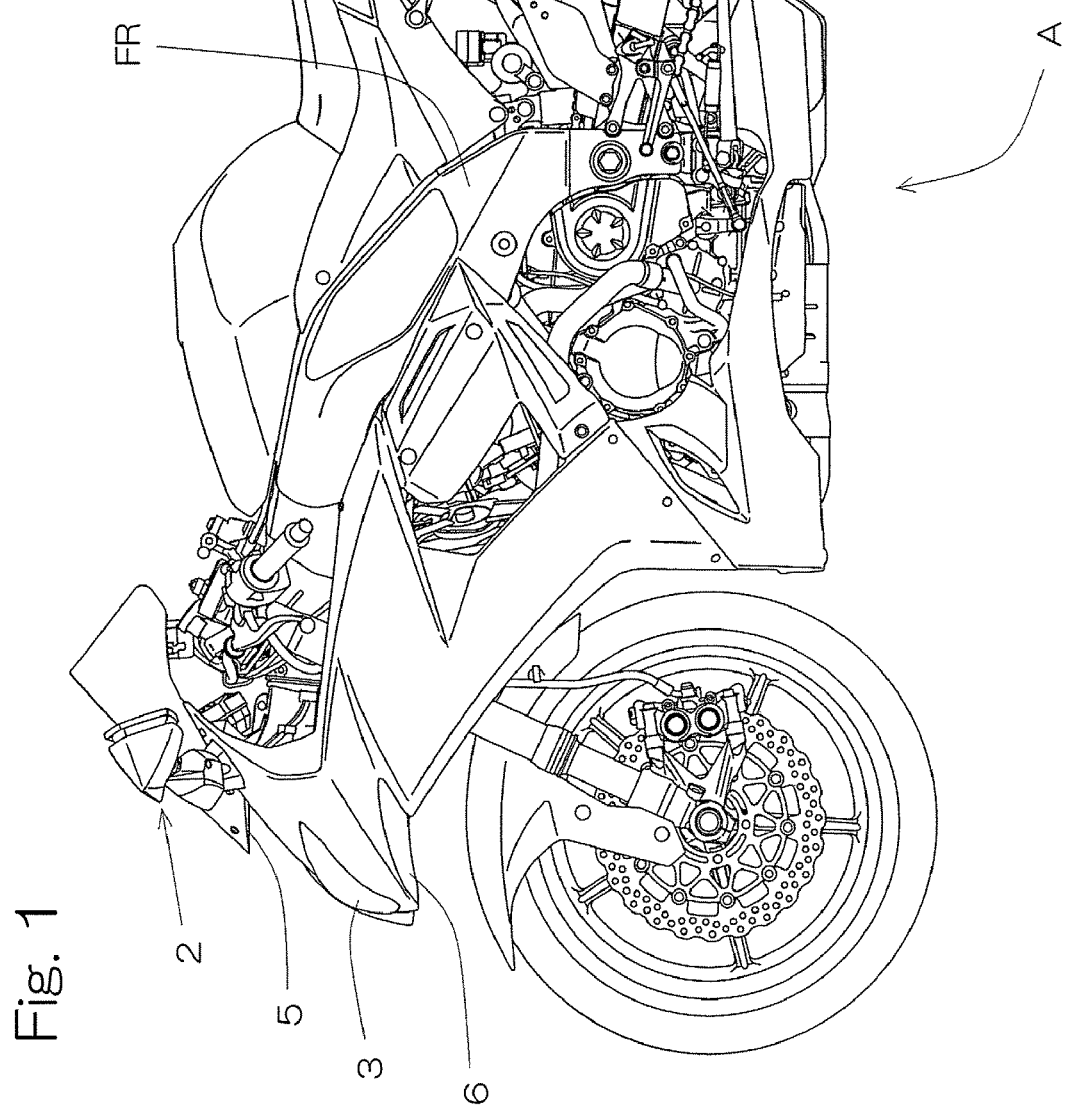
FIG. 1 is a side view of a motorcycle, having a combined viewing mirror and turn signal lamp assembly of the present invention secured to a portion of the motorcycle.
Figure 2:
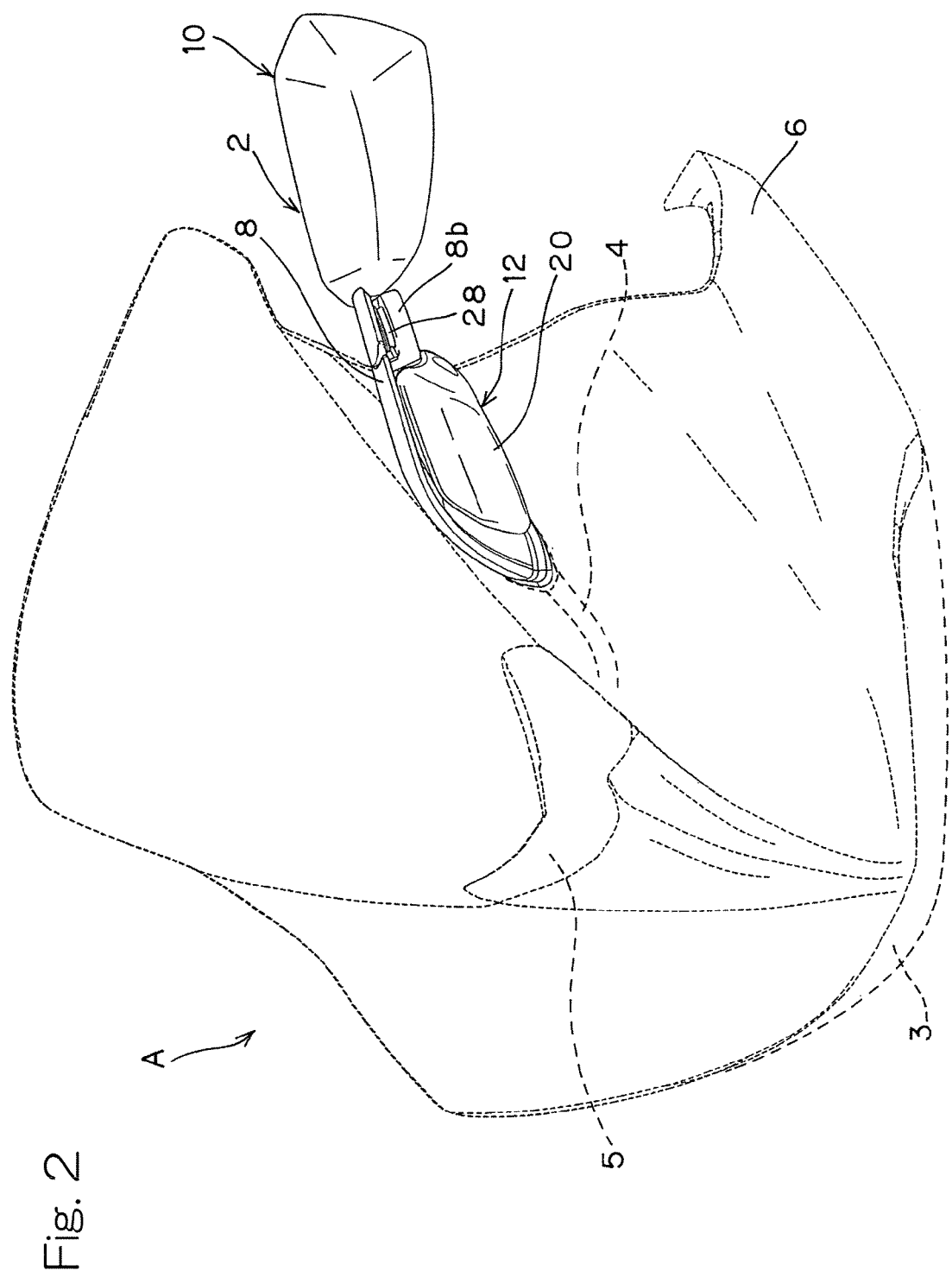
FIG. 2 is a schematic perspective view of the combined viewing mirror and turn signal lamp assembly mounted on a fairing of the motorcycle shown in FIG. 1.

FIG. 1 illustrates a motorcycle A having a combined viewing mirror and turn signal lamp assembly 2 of the embodiment of the present invention. As shown therein, the motorcycle A has a frame structure FR and a front fairing 6 mounted on a front portion of the frame structure FR. The fairing 6 has, as shown in FIG. 2 illustrating a perspective representation of the fairing 6, a headlight 3 mounted thereon and an air intake opening 5 defined therein and is fitted to the frame structure FR through a fairing bracket 4. A generally elongated stay 8 employed in accordance with the embodiment of the present invention is supported on the fairing bracket 4 with the fairing 6 sandwiched between the stay 8 and the fairing bracket 4.

Figure 3:
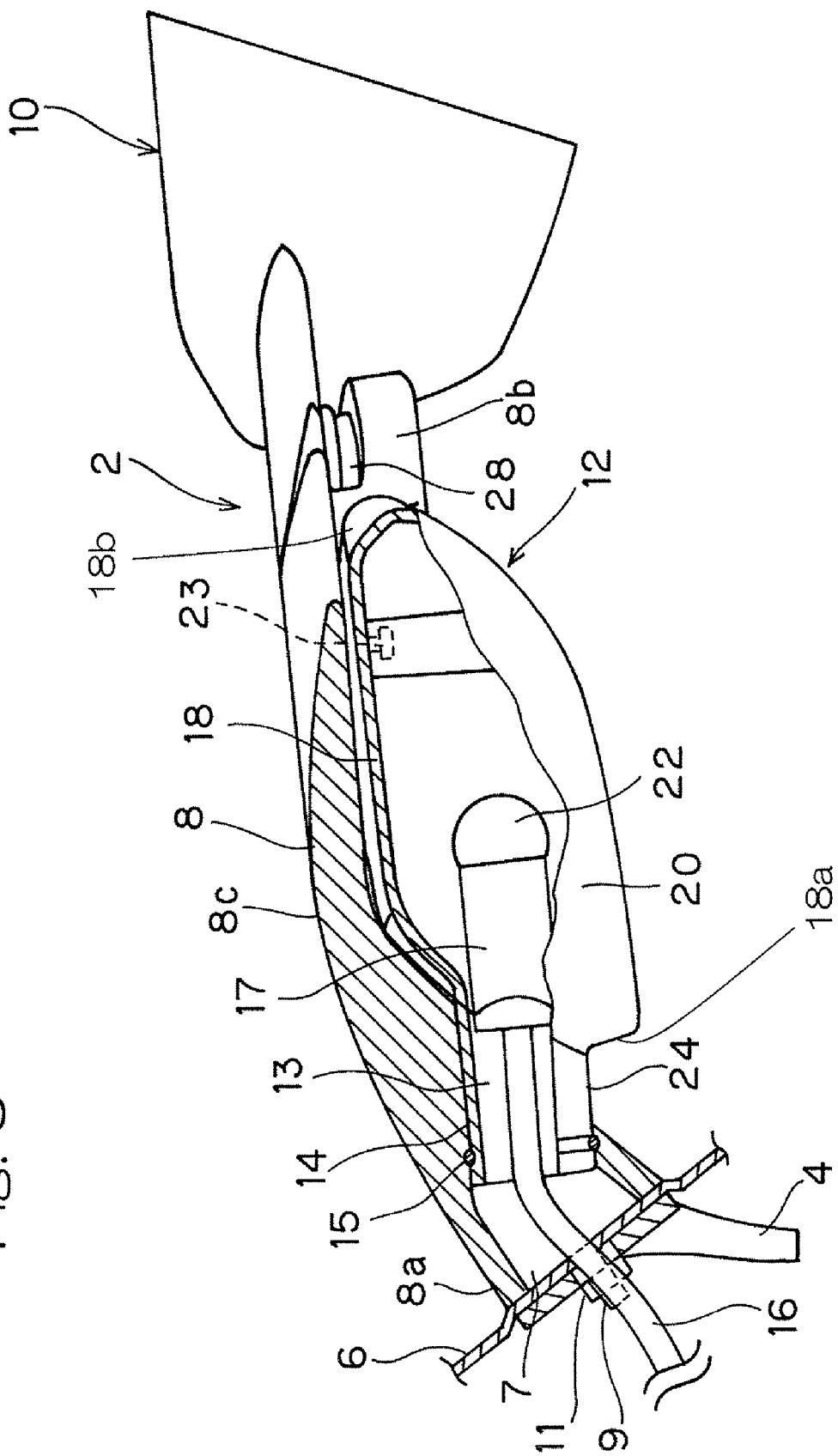
FIG. 3 is a longitudinal sectional view of the combined viewing mirror and turn signal lamp assembly shown in FIG. 1.

In further describing the details of the embodiment of the present invention, it is to be noted that the motorcycle A or any other automotive vehicle in practice makes use of two combined viewing mirror and turn signal lamp assemblies of symmetrical construction one on each side of the body of the motorcycle A, although only one combined viewing mirror and turn signal lamp assembly 2 is shown and described as used on a left side of the body of the motorcycle A, The stay 8 is made of a resin material and has first and second ends 8a and 8b opposite to each other and includes, for example, an insert bolt 9 provided in the first end 8a thereof, as best shown in FIG. 3, so as to extend axially outwardly therefrom. This stay 8 is fitted to the fairing bracket 4, forming a portion of the body of the motorcycle A, with the insert bolt 9 extending through the fairing 6 and then through the fairing bracket 4. A nut 11 is then fastened to the insert bolt 9, with that portion of the fairing 6 intervening between the fairing bracket 4 and the first end 8a, to thereby secure the stay 8 to the body of the motorcycle A.

As shown in FIG. 3, the stay 8 has a cable hole 7 defined in the first end 8a thereof so as to open axially outwardly, and an electric cable 16 is inserted exteriorly, that is, from the inside of the fairing 6 into the combined viewing mirror and turn signal lamp assembly 2 through the cable hole 7. This stay 8 also has a to-be-engaged portion 14 defined in a portion of the stay 8 at a location distant axially inwardly from the first end 8a thereof. This to-be-engaged portion 14 is in the form of a round engagement hole and is communicated with the cable hole 7. The opposite second end 8b of the stay 8 has a rear viewing mirror 10 connected therewith.

A turn signal lamp 12 is fitted to a portion 8c of the stay 8 generally or substantially intermediate between the first end 8a and second end 8b thereof so as to occupy a position generally or substantially intermediate between the first end 8a and the rear viewing mirror 10. Such portion 8c is hereinafter referred to as "an intermediate portion". This turn signal lamp 12 includes a turn signal lamp casing 18, a lens element 20 covering a front surface of the indicator casing 18, and a light emitting element 22, such as, for example, an electric bulb or a light emitting diode, accommodated within the indicator casing 18.

The turn signal lamp casing 18 is of a generally elongated configuration having a first end 18a adjacent the first end 8a of the stay 8 and formed with a tubular or hollow cylindrical engagement portion 24. This tubular engagement portion 24 extends generally axially outwardly from the body of the turn signal lamp casing 18 and a hollow of the tubular engagement portion 24 defines an insertion hole 13 for inserting the electric cable. An O-ring 15 is externally mounted on the tubular engagement portion 24 to avoid an undesirable ingress of water from the outside when and after the engagement portion 24 is engaged in the to-be-engaged portion 14. The electric cable 16 having a tip connected electrically with a socket 17 extends from the cable hole 7 into the turn signal lamp casing 18 through the insertion hole 13 defined in the tubular engagement portion 24. The light emitting element 22 is fitted to the socket 17 which is supported on the turn signal lamp casing 18.

Figure 4:
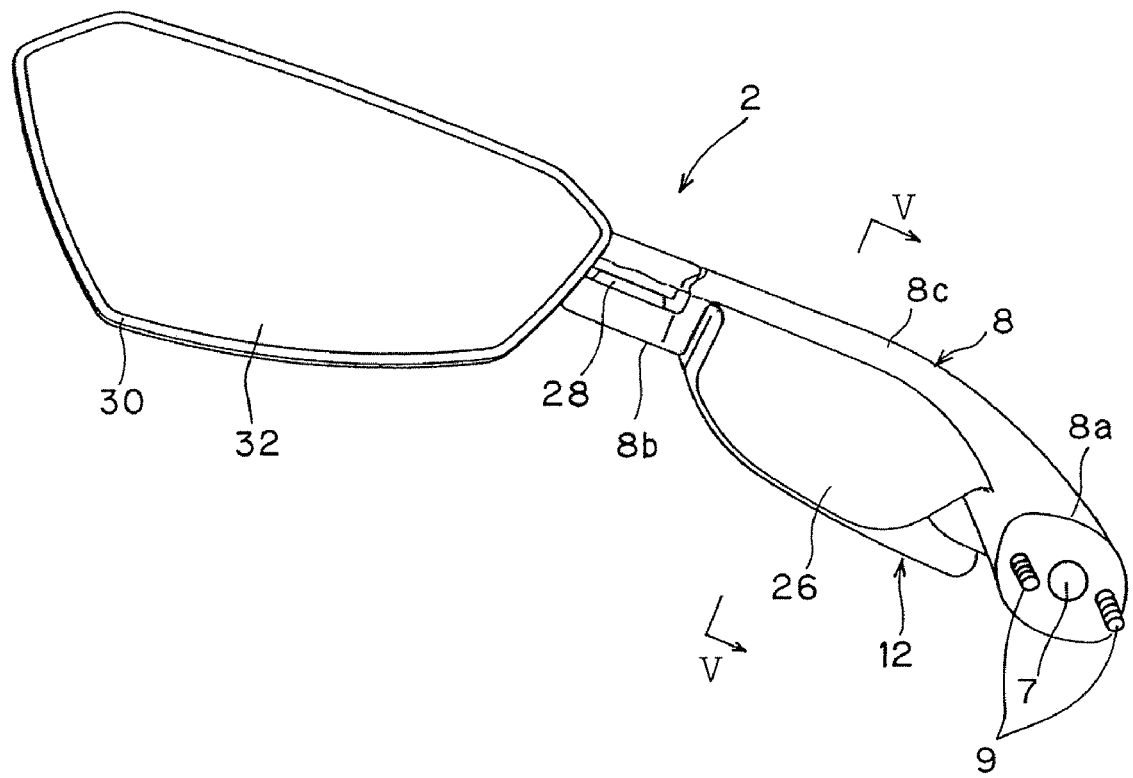
FIG. 4 is a schematic rear view of the combined viewing mirror and turn signal lamp assembly, as viewed from the eyes of a motorcycle rider.

FIG. 4 shows the combined viewing mirror and turn signal lamp assembly 2 as viewed from the eyes of a motorcycle rider. As shown therein, the stay 8 is formed integrally with a protective wall 26 extending downwardly therefrom so as to occupy a position rearwardly of the turn signal lamp 12 to protect the latter as clearly shown in FIG. 5 showing a cross-sectional representation taken along the line V-V in FIG. 4.

Figure 5:
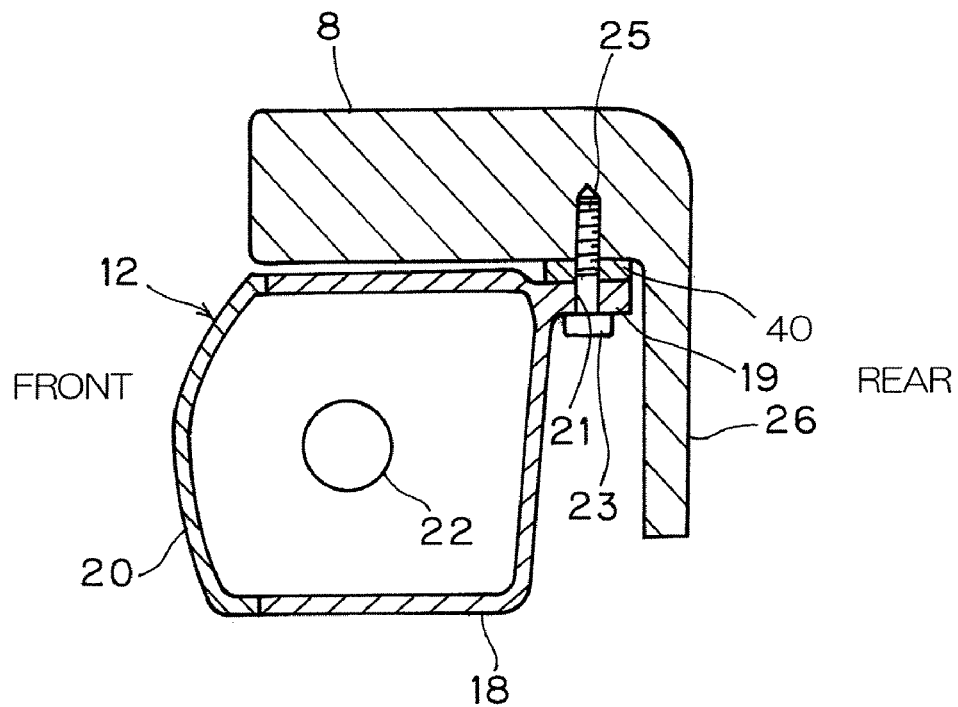
FIG. 5 is a cross-sectional view taken along the line V-V in FIG. 3.

As best shown in FIG. 5, the turn signal lamp casing 18 is formed at a rear upper portion thereof integrally with a coupling flange 19 so as to extend in a direction rearwardly thereof and towards the protective wall 26, and an insertion hole 21 is defined in the coupling flange 19. The turn signal lamp casing 18 of the structure described above is secured to the stay 8 by means of a fastening member such as, for example, a screw member 23. The screw member 23 extends through the insertion hole 21 and is then threaded into a screw hole 25 defined in the stay 8 through a damper element 27 such as, for example, a rubber member interposed between the flange 19 and the stay 8.

Referring again to FIG. 3, the screw member 23 used to secure the turn signal lamp casing 18 to the stay 8 is positioned at a location proximate to an upper portion of a second end 18b of the turn signal lamp casing 18 opposite to the first end 18a thereof and also remote from the tubular engagement portion 24 as shown by the phantom line in FIG. 3. As shown in FIG. 5, the screw member 23 is hence positioned in proximity of the protective wall 26 and particularly a root portion thereof. Accordingly, the screw member 23 is so covered by the protective wall 26 that such screw member 23 will not be viewable from rear.

Figure 6:
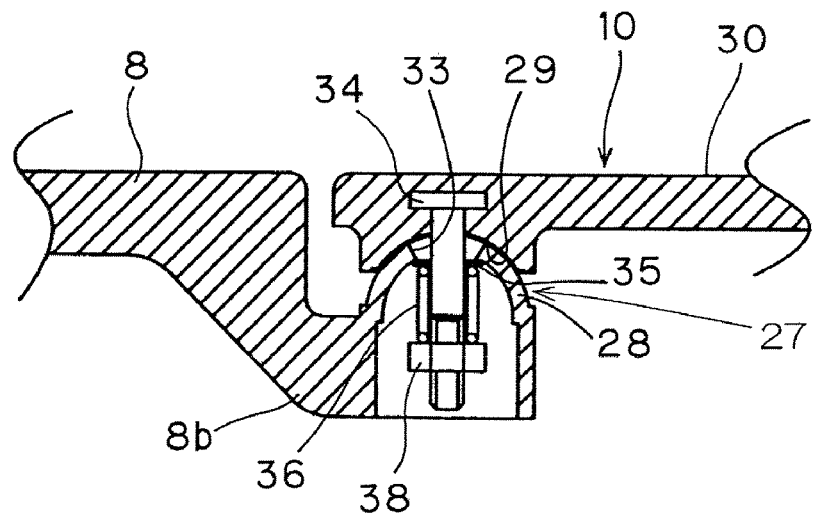
FIG. 6 is a fragmentary sectional view showing a connection between a generally elongated stay, forming a part of the combined viewing mirror and turn signal lamp assembly, and a rear viewing mirror also forming another part thereof.

FIG. 6 illustrates the details of connection by a spherical bearing unit 27 between the stay 8 and the rear viewing mirror 10, both forming respective parts of the viewing mirror and turn signal lamp assembly 2. As shown therein, a portion of the second end 8b of the stay 8, where the rear viewing mirror 10 is fitted, is formed integrally with a hollow boss open at one end thereof and closed at the opposite end by an outwardly extending semispherical bearing seat 28. As will become clear from the subsequent description, a wall defining the semispherical bearing seat 28 has an insertion hole 33 defined therein in alignment with the geometric center of the semispherical bearing seat 28.

On the other hand, the rear viewing mirror 10 includes a mirror body 30 and a mirror surface element 32 (FIG. 4) fitted pivotally or fixedly in the mirror body 30 by means of any known pivot mechanism (not shown). The mirror body 30 is formed with an inwardly recessed bearing socket 29 of a configuration complemental in shape to the semispherical bearing seat 28 so that the mirror body 30 can be joggled relative to the semispherical bearing seat 28, while the latter is seated within the bearing socket 29, for the purpose of adjustment of the tilt of the rear viewing mirror 10.

In order to permit the rear viewing mirror 10 to be joggled relative to the stay 8 in the manner described above and, also, to avoid separation of the rear viewing mirror 10, particularly the mirror body 30, from the second end 8b of the stay 8, an insert bolt 34 is fixed to the mirror body 30 in alignment with the geometric center of the bearing socket 29 by means of an insert molding technique. Accordingly, after the bearing socket 29 of the mirror body 30 has been fitted to the bearing seat 28 of the stay 8 with the insert bolt 34 extending through the insertion hole 33 into the hollow of bearing seat 28, and after an annular spring seat member 35 and a compression spring 36 have subsequently been mounted on a portion of the insert bolt 34 within the hollow of the bearing seat 28, a nut 38 is fastened to an externally threaded end portion of the insert bolt 34 also within the hollow boss of the stay 8. In this condition, the compression spring 36 is interposed between the annular spring seat member 35 and the nut 38 to thereby apply a resilient urging force necessary to draw the bearing socket 29 in the mirror body 30 consistently into sliding contact with the semispherical bearing seat 28 in the stay 8. Thus, it will readily be seen that the mirror body 30 can be joggled relative to the stay 8 in all directions about the geometric center of the semispherical bearing seat 28 that is coaxial with the longitudinal axis of the insert bolt 34.

According to the embodiment of the present invention having been fully described hereinbefore, since the rear viewing mirror 10 and the turn signal lamp 12, both best shown in FIG. 3, are assembled into the single assembly 2 in the manner as hereinabove described, the number of component parts can be reduced, and also, the efficiency with which the automotive vehicle is assembled can be increased. Specifically, the stay 8 is fitted at the first end 8a to the fairing bracket 4 and carries the rear viewing mirror 10 at the second end 8b thereof, and also, the turn signal lamp 12 is mounted on the intermediate portion 8c of the stay 8. Therefore, the assembly 2 is fixedly connected to the fairing bracket 4, and accordingly, adjustment of the tilt angle of the rear viewing mirror 10 will not result in the electric cable 16 being twisted and/or bent. Also, since the turn signal lamp 12 is located at a position substantially level with the rear viewing mirror 10, increase in visibility of the turn signal lamp 12 can be appreciated. It is also clear that since the rear viewing mirror 10 and the turn signal lamp 12 are lined up in a direction conforming to the longitudinal sense of the combined viewing mirror and turn signal lamp assembly 2, such assembly 2 can have an appearance pleasant to look, having been slimed in shape as a whole.

The stay 8 and the turn signal lamp 12 are provided respectively with the to-be-engaged portion 14 and the engagement portion 24 so that when those portions 14 and 24 are engaged with each other in the manner described hereinbefore, the turn signal lamp 12 can be supported on the stay 8. Accordingly, the use of the only one fastening member such as the screw member 23 as best shown in FIG. 5 is sufficient to allow the stay 8 and the turn signal lamp 12 to be carried together and as a result, the number of component parts can be reduced.

The provision of the protective wall 26 in the stay 8 is effective to protect the screw member 23, positioned rearwardly of the turn signal lamp 12, from undesirably contacting with peripheral parts and to conceal the screw member 23 from view to thereby provide a sophisticated appearance. The protective wall 26 also increases the cross-sectional shape of the stay 8 to thereby increase the strength of the stay 8. Also, since the stay 8 and the rear viewing mirror 10 are connected by the spherical bearing 27 and in particular, the semispherical bearing seat 28 formed integrally with the stay 8 and the inwardly recessed bearing socket 29 formed in the mirror body 30 are slidably overlapped one above the other, the rear viewing mirror 10 can have its tilt angle adjustable in all directions. In addition, in the event that an external impact acts on such rear viewing mirror 10 for some reason, the rear viewing mirror 10 can sway about the geometric center of the semispherical bearing seat 28 in a direction of the impact and, accordingly, damage to the rear viewing mirror 10 can be minimized advantageously.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A combined viewing mirror and turn signal lamp assembly, which comprises:
    a generally elongated stay having first and second ends opposite to each other, the first end of the elongated stay being connected with a body of an automotive vehicle;
    a viewing mirror connected with the second end of the elongated stay; and
    a turn signal lamp incorporated in the stay;
    wherein the turn signal lamp is provided with an engagement portion and the stay is provided with a to-be-engaged portion,
    further comprising a fastening member for removably connecting the turn signal lamp to the stay while the engagement portion is engaged in the to-be-engaged portion,
    wherein the turn signal lamp comprises a turn signal lamp casing, having first and second ends opposite to each other, and a light emitting element accommodated within the turn signal lamp casing;
    wherein the engagement portion is a hollow cylinder formed in the first end of the turn signal lamp casing;
    wherein the stay has a cable hole defined therein for passage of an electric cable therethrough into the assembly, a part of the cable hole forming an engagement hole, which forms the to-be-engaged portion; and
    wherein the electric cable is introduced into the turn signal lamp casing after having passed through the cable hole and the hollow of the engagement portion.

2. A combined viewing mirror and turn signal lamp assembly, which comprises:
- a generally elongated stay having first and second ends opposite to each other, the first end of the elongated stay being connected with a body of an automotive vehicle, the stay being provided with a to-be-engage portion;
- a viewing mirror connected with the second end of the elongated stay; and
- a turn signal lamp incorporated in the stay;
- wherein the turn signal lamp has an engagement portion, a turn signal lamp casing, and a light emitting element accommodated within the turn signal lamp casing,
- wherein the engagement portion is a hollow tube formed in the turn signal lamp casing,
- wherein the stay has a cable hole defined therein for passage of an electric cable therethrough into the assembly, a part of the cable hole forming an engagement hole, which forms the to-be-engaged portion; and
- wherein the electric cable is introduced into the turn signal lamp casing after having passed through the cable hole and the hollow of the engagement portion.

3. The combined viewing mirror and turn signal lamp assembly as claimed in claim 2, wherein the turn signal lamp is positioned generally intermediate between the first end of the stay and the rear viewing mirror.

4. The combined viewing mirror and turn signal lamp assembly as claimed in claim 2, wherein the turn signal lamp has first and second ends opposite to each other and wherein the engagement portion is defined in the first end of the turn signal lamp casing and the turn signal lamp is connected with the stay through a fastening member at a portion thereof adjacent the second end of such turn signal lamp.

5. The combined viewing mirror and turn signal lamp assembly as claimed in claim 2, further comprising a protective wall formed in the stay for covering a region rearwardly of the turn signal lamp.

6. The combined viewing mirror and turn signal lamp assembly as claimed in claim 2, wherein the viewing mirror is connected with the stay by means of a spherical bearing unit for angular movement relative to the stay.

* * * * *